3,792,052
HYDRAZINECARBODITHIOATE DERIVATIVES
AND METAL CHELATES THEREOF
Brian William Sharp, Hornchurch, Dennis Warburton, Upminster, and Kenneth Robert Harry Wooldridge, Brentwood, England, assignors to May & Baker Limited, Dagenham, Essex, England
No Drawing. Filed Nov. 17, 1970, Ser. No. 90,446
Claims priority, application Great Britain, Nov. 18, 1969, 56,500/69
Int. Cl. C07d 27/04
U.S. Cl. 260—268 R    14 Claims

ABSTRACT OF THE DISCLOSURE

The new hydrazinecarbodithioate derivatives of the formula:

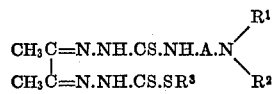

wherein each of $R^1$ and $R^2$ represents alkyl, aryl or aralkyl, cycloalkyl of 5 through 8 carbon atoms, or cycloalkylalkyl in which the cycloalkyl moiety contains 5 through 8 carbon atoms and the alkyl moiety contains 1 through 4 carbon atoms, or $R^1$ represents alkanoyl and $R^2$ is as hereinbefore defined, or $R^1$ and $R^2$ together with the nitrogen atom to which they are attached form a saturated or partially saturated three through eight-membered heterocyclic group, $R^3$ represents alkyl of 1 through 4 carbon atoms, which may be substituted by at least one alkoxy group of 1 through 4 carbon atoms, and A represents a divalent polymethylene group of 2 through 4 carbon atoms, which may be substituted by at least one alkyl group, and metal chelates and non-toxic acid addition salts thereof, are useful in the prevention and treatment of coccidiosis in chickens and turkeys.

---

This invention relates to new hydrazinecarbodithioate derivatives which possess anticoccidial activity, to processes for their preparation, to compositions containing them and to their use in the prevention and treatment of coccidiosis.

Coccidiosis, a disease caused by infections by protozoan parasites of the genus Eimeria, is one of the most important potential causes of economic loss in poultry flocks, for example chickens and turkeys, particularly those raised under intensive conditions. The disease has a world-wide incidence and may occur wherever poultry are reared, and, if left untreated, often causes extensive loss of fowl. Economic loss results not only from mortality of the infected birds but also morbidity which may manifest itself in depression of body growth rate, reduction of food conversion efficiency and a general deterioration which is found in the carcass at slaughter. The elimination or control of coccidiosis is, therefore, of the utmost importance in successful poultry rearing. Hitherto, the control of the disease has been effected by the use of anticoccidial drugs, generally administered in the feed to prevent outbreaks by inhibiting or slowing down the rate of multiplication of Eimeria within the birds, or by administration in drinking water to treat established disease. Coccidiostats which have been used commercially to combat the disease in chickens are of various chemical types, for example 1-(4-amino-2-n-propyl-5-pyrimidinylmethyl) - 2 - picolinium chloride hydrochloride (amprolium), 3,5-dinitro-o-toluamide (zoalene), 2-sulphanilamido-quinoxaline (sulphaquinoxaline) and 5-nitro-2-furaldehyde (nitrofurazone).

As a result of research and experimentation, there have been found new hydrazinecarbodithioate derivatives, which are useful in combatting coccidiosis, of the general formula:

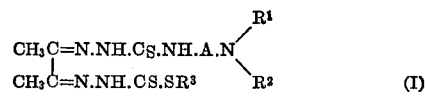

wherein $R^1$ and $R^2$ are the same or different and each represents an alkyl group, an aryl (e.g. phenyl) group, an aralkyl (e.g. phenylalkyl) group, a cycloalkyl group containing 5 to 8 carbon atoms or a cycloalkylalkyl group in which the cycloalkyl moiety contains 5 to 8 carbon atoms and the alkyl moiety contains 1 to 4 carbon atoms, or $R^1$ represents an alkanoyl (e.g. acetyl) group and $R^2$ is as hereinbefore defined, or $R^1$ and $R^2$ together with the nitrogen atom to which they are attached form a saturated or partially saturated three to eight-membered heterocyclic group, which may be substituted by at least one alkyl group and which may contain at least one additional hetero atom selected from oxygen, nitrogen and sulphur atoms, and one carbon atom of the heterocyclic group may be joined to a ketonic oxygen atom, for example pyrrolidin-1-yl, 2-oxopyrrolidin-1-yl, piperidino, morpholino, perhydroazepin-1-yl, hexamethyleneimino, heptamethyleneimino or N-alkylpiperazin-1-yl, $R^3$ represents an alkyl group containing at most 4, preferably 1 to 3, carbon atoms, more particularly an ethyl group, which may be substituted by at least one alkoxy group containing 1 to 4 carbon atoms, and A represents a divalent polymethylene group containing 2 to 4 carbon atoms, optionally substituted by at least one alkyl group.

In this specification, it is to be understood that, unless otherwise indicated, the aforementioned alkyl groups and alkyl portions of alkanoyl and aralkyl groups contain 1 to 6 carbon atoms and may have straight or branched chains.

The compounds of General Formula I are effective in the control simultaneously of species of Eimeria causing both intestinal and caecal coccidiosis in chickens and turkeys. Present investigations of the use of the compounds of Formula I against the disease in chicken and turkeys indicate that they are particularly effective against Eimeria tenella and Eimeria adenoides, which are responsible respectively for severe infections of the caeca of chickens and turkeys, and Eimeria acervulina and Eimeria meleagrimitis which cause respectively intestinal infections in chickens and turkeys, which infections, even when not resulting in mortality, nevertheless result in economic loss due to depression of growth rate and feed-conversion efficiency and carcass deterioration. Certain of the compounds of General Formula I, for example ethyl 2-{1,2-dimethyl - 2 - [4 - (3 - hexamethyleneiminopropyl)thiosemicarbazono ] ethylidene } hydrazinecarbodithioate and, more particularly, ethyl 2-{1,2-dimethyl-2-[4-(3-pyrrolidin - 1' - ylpropyl)thiosemicarbazono]ethylidene}hydrazinecarbodithioate, are also effective against infections of Eimeria necatrix, Eimeria brunetti and Eimeria maxima in chickens and are, accordingly, effective against the five species of Eimeria which are generally regarded as being responsible for the economic losses due to coccidiosis in the rearing of chickens. The compounds of General Formula I suppress the mortality and morbidity to which intestinal and caecal coccidiosis normally give rise, and consequently have a favorable effect on the weight gain of the birds without adverse effect upon their health at administration rates useful in the prevention and treatment of coccidiosis, i.e. when an anti-coccidially-effective amount of one or more of the compounds of General Formula I is administered to the birds. Good results in the prevention and treatment of coccidiosis in chickens and turkeys are obtained when the compounds of General Formula I are administered at concentrations of from about 0.0025% to about 0.025% by weight in a balanced chicken or turkey feed or drinking water, more particularly at concentrations of from 0.005% to 0.015% by weight in a balanced chicken or turkey feed.

Preferred hydrazinecarbodithioate derivatives of the invention are those of General Formula I wherein $R^1$ represents an alkyl, phenyl or phenylalkyl group, a cycloalkyl group containing 5 or 6 carbon atoms, or an alkanoyl (e.g. acetyl) group, and $R^2$ represents an alkyl group, or $R^1$ and $R^2$ together with the nitrogen atom to which they are attached form a pyrrolidin-1-yl, 2-oxopyrrolidin-1-yl, piperidino, morpholino, hexamethyleneimino, heptamethyleneimino or N - alkylpiperazin - 1 - yl group, optionally carrying an alkyl substituent on a carbon atom of the heterocyclic nucleus, and more especially such compounds in which $R^3$ represents an alkyl group of 1 to 3 carbon atoms, more particularly ethyl, which alkyl group may be substituted by an alkoxy group containing 1 to 4 carbon atoms, e.g. ethoxy, and A is as hereinbefore defined.

Of particular value in the prevention of cocciodiosis in chickens are those compounds of General Formula I in which $R^3$ represents an ethyl group and more especially ethyl 2-{1,2-dimethyl-2-[4-(2-diethylaminoethyl)thio-semicarbazono]ethylidene}hydrazinecarbodithioate,
ethyl 2-{1,2-dimethyl-2-[4-(3-diethylaminopropyl)thio-semicarbazono]ethylidene}hydrazinecarbodithioate,
ethyl 2-{1,2-dimethyl-2-[4-(3-pyrrolidin-1'-ylpropyl)thio-semicarbazono]ethylidene}hydrazinecarbodithioate,
ethyl 2-{1,2-dimethyl-2-[4-(3-piperidinopropyl)thio-semicarbazono]ethylidene}hydrazinecarbodithioate,
ethyl 2-{1,2-dimethyl-2-[4-(3-4'-methylpiperidinopropyl thiosemicarbazono]ethylidene}hydrazinecarbodi-thioate, and
ethyl 2-{1,2-dimethyl-2-[4-(3-4'-methylpiperazin-1'-yl-propyl)thiosemicarbazono]ethylidene}hydrazine-carbodithioate.

The third named of these compounds is also of particular value in the prevention of cocciodiosis in turkeys.

The compounds of General Formula I may be administered to chickens or turkeys as such or in the form of their metal chelates of the general formula:

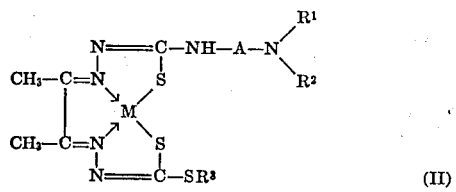

(II)

(wherein $R^1$, $R^2$, $R^3$ and A are as hereinbefore defined and M represents the divalent cation of manganese, iron, zinc, tin, cobalt, copper or nickel), or in the form of non-toxic acid addition salts of the bases of General Formulae I and II (i.e. salts the anions of which are non-toxic at the dosages used) such as hydrochlorides, sulphates, nitrates, phosphates, acetates, propionates, succinates, benzoates, fumarates, maleates, tartrates, theophyllinacetates, salicylates, phenolphthalinates, and methylene-bis-β-hydroxynaphthoates.

The compounds of General Formula I may be prepared by suitable adaptation of known methods for the conversion of compounds containing ketonic groups into their thiosemicarbazone or dithiocarboxyhydrazone derivatives. Thus, according to a feature of the present invention, they are prepared by the stepwise condensation of butan-2,3-dione with one equivalent of a thiosemicarbazide of the general formula:

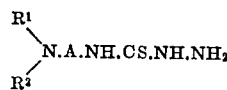

(III)

(wherein $R^1$, $R^2$ and A are as hereinbefore defined) and one equivalent of an alkyl or alkoxyalkyl hydrazinecarbodithioate of the general formula:

$$R^3S \cdot CS \cdot NHNH_2 \qquad (IV)$$

(wherein $R^3$ is as hereinbefore defined), reaction being effected in an inert organic solvent (e.g. methanol, dimethylformamide or glacial acetic acid) at a suitable temperature, preferably between 0° C. and the reflux temperature of the reaction mixture, more especially between 0° C. and 70° C.

Accordingly, the compounds of Formula I may be prepared by the reaction of one equivalent of a compound of Formula IV with a thiosemicarbazone of the general formula:

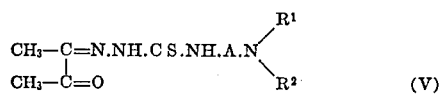

(V)

(wherein $R^1$, $R^2$ and A are as hereinbefore defined) or an acid addition salt thereof, compounds of Formula V themselves being prepared by the reaction of one equivalent of a compound of Formula III with butan-2,3-dione, or alternatively compounds of Formula I may be prepared by the reaction of one equivalent of a compound of Formula III with a compound of the general formula:

(VI)

(wherein $R^3$ is as hereinbefore defined), compounds of Formula VI themselves being prepared by the reaction of one equivalent of a compound of Formula IV with butan-2,3-dione.

Compounds of Formula III may be prepared by known methods, for example by the reaction of compounds of the general formula:

(VII)

(wherein $R^1$, $R^2$ and A are as hereinbefore defined) with hydrazine, conveniently in the form of hydrazine hydrate, in a suitable solvent, for example an alkanol containing at most 4 carbon atoms (e.g. ethanol), preferably at 0 to 25° C.

Compounds of Formula VII may be prepared by known methods, for example by a reaction sequence which may be schematically represented as follows:

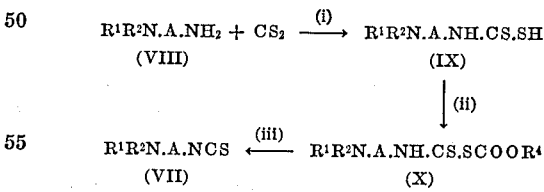

(wherein $R^1$, $R^2$ and A are as hereinbefore defined and $R^4$ represents the residue of an alcohol, conveniently an alkyl group containing at most 4 carbon atoms, preferably an ethyl group. The reaction (i) is preferably carried out in an inert solvent at temperatures from −25° C. to room temperature, and more especially, initially at a temperature of −15 to −10° C., the reaction mixture subsequently being allowed to form to +10° C. The reaction is preferably carried out in the presence of a basic catalyst and acid-binding agent, which may be, for example, an inorganic base, for example a hydroxide of an alkali or alkaline earth metal, e.g. sodium hydroxide, or a tertiary amine, e.g. triethylamine. Reaction (ii), advantageously carried out without isolation of the intermediate IX from the reaction mixture in which it is prepared, is effected with a compound of the general formula:

$$XCOOR^4 \qquad (XI)$$

(wherein R⁴ is as hereinbefore defined and X represents a halogen atom, preferably a chlorine atom), preferably at temperatures from −25° C. to room temperature, and more especially initially at a temperature of −15 to −10° C., the reaction mixture subsequently being allowed to warm to room temperature. Reaction (iii), advantageously carried out without isolation of the intermediate X from the reaction mixture in which it is prepared, is effected with an organic base, e.g. triethylamine, in a suitable solvent, e.g. chloroform, or with aqueous alkali, for example by slowly adding the aforesaid reaction mixture to an aqueous solution of sodium hydroxide, preferably keeping the temperature below 60° C., and more especially between 20 and 30° C.

Compounds of Formula IV may be prepared by known methods, for example by the reaction of a compound of the general formula:

$$R^3Z \quad (XII)$$

(wherein $R^3$ is as hereinbefore defined and Z represents the acid residue of a reactive ester, for example a halogen atom, preferably a bromine or iodine atom, or a sulphuric or sulphonic ester residue) with hydrazinium dithiocarbazate of the formula $$[(NH_2NH_3)^+(NH_2NH \cdot CS \cdot S)^-]$$

in a suitable solvent, for example, water, hexamethylphosphoric triamide, or a mixture of water and a suitable polar organic solvent, for example dimethylformamide, preferably at a temperature below room temperature, more especially at 0 to 10° C.

The chelates of General Formula II and acid addition salts thereof may be prepared by the addition of a suitable salt (e.g. the acetate) of the appropriate metal in solution in water or an inert organic solvent (e.g. dimethylformamide) to an equimolar quantity of a compound of General Formula I in solution in a suitable watermiscible solvent, for example methanol, dimethylformamide, dimethylsulphoxide, and mixtures thereof, optionally in conjunction with water. The chelate precipitates and may be collected by filtration and dried by known methods.

Acid addition salts of the compounds of General Formula I may be prepared by the reaction of the compounds of Formula I with acids in appropriate solvents, such as alcohols, ethers, ketones and chlorinated hydrocarbon solvents. The salt formed precipitates, after concentration of its solution where appropriate, and is separated by filtration or decantation.

By the term "known methods" as used in this specification is meant methods heretofore used or described in the literature.

The following examples illustrate the preparation of the new hydrozinecarbodithioate derivatives of the present invention.

EXAMPLE 1

A solution of methyl hydrazinecarbodithioate (24.5 g.) in warm methanol (300 ml.) was added to a solution of 2 - [4 - (2 - diethylaminoethyl)thiosemicarbazono] butane - 3 - one monohydrochloride (59 g.) in warm methanol (300 ml.). The mixture was allowed to stand for 24 hours at ambient temperature and then it was poured into an excess of aqueous sodium carbonate and stirred for 15 minutes at room temperature. The precipitate thus obtained was filtered off, washed with water, dried over silica gel in vacuo and crystallized from a 1:2 mixture of benzene and petroleum ether (60–80° C.) to give pure methyl 2-{1,2-dimethyl-2-dimethyl-2-[4-(2-diethylaminoethyl)thio-semicarbazono]ethylidene}hydrazinecarbodithioate (60.0 g.), M.P. 177° C. (with decomposition).

Following a similar procedure, but using the appropriate hydrazinecarbodithioates of Formula IV and the appropriate thiosemicarbazones of Formula V, there were prepared the following compounds:

ethyl 2-{1,2-dimethyl-2-[4-(2-diethylaminoethyl)thiosemicarbazono]ethylidene}hydrazinecarbodithioate, M.P. 162–163° C. (with decomposition);

propyl 2-{1,2-dimethyl-2-[4-(2-diethylaminoethyl)thiosemicarbazono]ethylidene}hydrazinecarbodithioate, M.P. 164–165° C. (with decomposition);

isopropyl 2-{1,2-dimethyl-2-[4-(2-diethylaminoethyl)-thiosemicarbazono]ethylidene}hydrazinecarbodithioate, M.P. 182–184° C. (with decomposition);

butyl 2-{1,2-dimethyl-2-[4-(2-diethylaminoethyl)thiosemicarbazono]ethylidene}hydrazinecarbodithioate, M.P. 158–160° C. (with decomposition);

isobutyl 2-{1,2-dimethyl-2-[4-(2-diethylaminoethyl)thiosemicarbazono]ethylidene}hydrazinecarbodithioate, M.P. 170° C. (with decomposition);

sec-butyl 2-{1,2-dimethyl-2-[4-(2-diethylaminoethyl)thiosemicarbazono]ethylidene}hydrazinecarbodithioate, M.P. 174–175° C. (with decomposition);

methyl 2-{1,2-dimethyl-2-[4-(2-dimethylaminoethyl)thiosemicarbazono]ethylidene}hydrazinecarbodithioate, M.P. 192–194 C. (with decomposition);

ethyl 2{1,2-dimethyl-2-[4-(2-dimethylaminoethyl)thiosemicarbazono]ethylidene}hydrazinecarbodithioate, M.P. 169–170° C.;

methyl 2-{1,2-dimethyl-2-[4-(2-piperidinoethyl)thiosemicarbazono]ethylidene}hydrazinecarbodithioate, M.P. 195–197° C. (with decomposition);

ethyl 2-{1,2-dimethyl-2-[4-(2-piperidinoethyl)thiosemicarbazono]ethylidene}hydrazinecarbodithioate, M.P. 185–187° C. (with decomposition);

methyl 2-{1,2-dimethyl-2-[4-(3-diethylaminopropyl)thiosemicarbazono]ethylidene}hydrazinecarbodithioate, M.P. 166–167° C. (with decomposition);

ethyl 2-{1,2-dimethyl-2-[4-(3-diethylaminopropyl)thiosemicarbazono]ethylidene}hydrazinecarbodithioate, M.P. 160–161° C. (with decomposition);

ethyl 2-{1,2-dimethyl-2-[4-(3-dipropylaminopropyl)thiosemicarbazono]ethylidene}hydrazinecarbodithioate, M.P. 166° C. (with decomposition);

ethyl 2-{1,2-dimethyl-2-[4-(3-di-isopropylaminopropyl)thiosemicarbazono]ethylidene}hydrazinecarbodithioate, M.P. 165–166° C. (with decomposition);

methyl 2-{1,2-dimethyl-2-[4-(3-N-butyl-N-methylaminopropyl)thiosemicarbazono]ethylidene}hydrazinecarbodithioate, M.P. 162–164° C. (with decomposition);

ethyl 2-{1,2-dimethyl-2-[4-(3-N-butyl-N-methylaminopropyl)thiosemicarbazono]ethylidene}hydrazinecarbodithioate, M.P. 158–160° C. (with decomposition);

methyl 2-{1,2-dimethyl-2-[4-(3-N-methyl-N-cyclopentylaminopropyl)thiosemicarbazono]ethylidene}hydrazinecarbodithioate, M.P. 161–163° C. (with decomposition);

ethyl 2-{1,2-dimethyl-2-[4-(3-N-methyl-N-cyclopentylaminopropyl)thiosemicarbazono]ethylidene}hydrazinecarbodithioate, M.P. 158–159° C. (with decomposition);

ethyl 2-{1,2-dimethyl-2-[4-(3-N-cyclohexyl-N-methylaminopropyl)thiosemicarbazono]ethylidene}hydrazinecarbodithioate, M.P. 154–155° C. (with decomposition);

ethyl 2-{1,2-dimethyl-2-[4-(3-N-methylanilinopropyl)thiosemicarbazono]ethylidene}hydrazinecarbodithioate, M.P. 178–180° C. (with decomposition);

methyl 2-{1,2-dimethyl-2-[4-(3-N-methyl-N-benzylaminopropyl)thiosemicarbazono]ethylidene}hydrazinecarbodithioate, M.P. 160–162° C. (with decomposition);

ethyl 2-{1,2-dimethyl-2-[4-(3-N-methyl-N-benzylaminopropyl)thiosemicarbazono]ethylidene}hydrazinecarbodithioate, M.P. 148–151° C.;

ethyl 2-{1,2-dimethyl-2-[4-(3-pyrrolidin-1'-yl-propyl)
thiosemicarbazono]ethylidene}hydrazinecarbodithioate, M.P. 153–154° C. (with decomposition);

methyl 2-{1,2-dimethyl-2-[4-(3-piperidinopropyl)thiosemicarbazono]ethylidene}hydrazinecarbodithioate, M.P. 167–169° C. (with decomposition);

ethyl 2-{1,2-dimethyl-2-[4-(3-piperidinopropyl)thiosemicarbazono]ethylidene}hydrazinecarbodithioate, M.P. 159–160° C. (with decomposition);

ethyl 2-{1,2-dimethyl-2-[4-(3-2'-methylpiperidinopropyl)thiosemicarbazono]ethylidene}hydrazinecarbodithioate, M.P. 152–153° C. (with decomposition);

methyl 2-{1,2-dimethyl-2-[4-(3-4'-methylpiperidinopropyl)thiosemicarbazono]ethylidene}hydrazinecarbodithioate, M.P. 164–165° C. (with decomposition);

ethyl 2-{1,2-dimethyl-2-[4-(3-4'-methylpiperidinopropyl)thiosemicarbazono]ethylidene}hydrazinecarbodithioate, M.P. 158–159° C. (with decomposition);

ethyl 2-{1,2-dimethyl-2-[4-(3-4'-ethylpiperidinopropyl)thiosemicarbazono]ethylidene}hydrazinecarbodithioate, M.P. 159–160° C. (with decomposition);

ethyl 2-{1,2-dimethyl-2-[4-(3-hexamethyleneiminopropyl)thiosemicarbazono]ethylidene}hydrazinecarbodithioate, M.P. 154–155° C. (with decomposition);

ethyl 2-{1,2-dimethyl-2-[4-(3-heptamethyleneiminopropyl)thiosemicarbazono]ethylidene}hydrazinecarbodithioate, M.P. 159–160° C. (with decomposition);

methyl 2-{1,2-dimethyl-2-[4-(3-4'-methylpiperazin-1'-ylpropyl)thiosemicarbazono]ethylidene}hydrazinecarbodithioate, M.P. 160–161° C. (with decomposition);

ethyl 2-{1,2-dimethyl-2-[4-(3-4'-methylpiperazin-1'-ylpropyl)thiosemicarbazono]ethylidene}hydrazinecarbodithioate, M.P. 156–157° C. (with decomposition);

ethyl 2-{1,2-dimethyl-2-[4-(2-methyl-3-piperidinopropyl)thiosemicarbazono]ethylidene}hydrazinecarbodithioate, M.P. 173–174° C.;

ethyl 2-{1,2-dimethyl-2-[4-(3-piperidinobutyl)thiosemicarbazono]ethylidene}hydrazinecarbodithioate, M.P. 150–152° C.;

ethyl 2-{1,2-dimethyl-2-[4-(4-pyrrolidin-1'-ylbutyl)thiosemicarbazono]ethylidene}hydrazinecarbodithioate, M.P. 148–150° C. (with decomposition);

ethyl 2-{1,2-dimethyl-2-[4-(3-2'-oxopyrrolidin-1'-ylpropyl)thiosemicarbazono]ethylidene}hydrazinecarbodithioate, M.P. 189° C. (with decomposition); and 2-ethoxyethyl 2-{1,2-dimethyl-2-[4-(3-piperidinopropyl)thiosemicarbazono]ethylidene}hydrazinecarbodithioate, M.P. 134–136° C.

The 2-[4-(2-diethylaminoethyl)thiosemicarbazono]butan-3-one monohydrochloride, used as a starting material in the preparation of methyl 2-{1,2-dimethyl-2-[4-(2-diethylaminoethyl) thiosemicarbazono] ethylidene}hydrazinecarbodithioate hereinbefore described, was prepared as follows:

A solution of 4-(2-diethylaminoethyl)thiosemicarbazide (34.95 g.) in hot ethanol (180 ml.) containing concentrated hydrochloric acid (15.72 ml.) was added to a solution of butan-2,3-dione (41.28 g.) in ethanol (180 ml.). The cooled mixture was allowed to stand for 45 minutes at ambient temperature and then the solvent was removed in vacuo. The residue was dried azeotropically with benzene and was recrystallized from ethanol to give pure 2-[4-(2-diethylaminoethyl)thiosemicarbazono]butan-3-one monohydrochloride (43.2 g.), M.P. 176° C. (with decomposition).

In a similar manner, but substituting the appropriate thiosemicarbazides of Formula III for the 4-(2-diethylaminoethyl)thiosemicarbazide, there were prepared the following thiosemicarbazones of Formula V used as starting materials in the preparations of the compounds of Formula I hereinbefore described:

2-[4-(2-dimethylaminoethyl)thiosemicarbazono]butan-3-one hydrochloride, M.P. 181–182° C.;

2-[4-(2-piperidinoethyl)thiosemicarbazono]butan-3-one hydrochloride, M.P. 240° C. (with decomposition);

2-[4-(3-diethylaminopropyl)thiosemicarbazono]butan-3-one, an oil;

2-[4-(3-dipropylaminopropyl)thiosemicarbazono]butan-3-one, an oil;

2-[4-(3-diisopropylaminopropyl)thiosemicarbazono]butan-3-one, an oil;

2-[4-(3-N-butylmethylaminopropyl)thiosemicarbazone]butan-3-one, M.P. 37–40° C.;

2-[4-(3-N-methyl-N-cyclopentylaminopropyl)thiosemicarbazono]butan-3-one, M.P. 73–75° C.;

2-[4-(3-N-methyl-N-cyclohexylaminopropyl)thiosemicarbazono]butan-3-one, M.P. 74–75° C.;

2-[4-(3-N-methylanilinopropyl)thiosemicarbazono]butan-3-one, an oil;

2-[4-(3-N-methyl-N-benzylaminopropyl)thiosemicarbazono]butan-3-one, M.P. 96–98° C.;

2-[4-(3-pyrrolidin-1'-ylpropyl)thiosemicarbazono]butan-3-one, M.P. 66–67° C.;

2-[4-(3-piperidinopropyl)thiosemicarbazono]butan-3-one hydrochloride, M.P. 167–169° C.;

2-[4-(3-2'-methylpiperidinopropyl)thiosemicarbazono]butan-3-one, an oil;

2-[4-(3-4'-methyliperidinopropyl)thiosemicarbazono]butan-3-one, M.P. 68–69° C., hydrochloride M.P. 155–156° C.;

2-[4-(3-4'-ethylpiperidinopropyl)thiosemicarbazono]butan-3-one, an oil;

2-[4-(3-hexamethyleneiminopropyl)thiosemicarbazono]butan-3-one, an oil;

2-[4-(3-heptamethyleneiminopropyl)thiosemicarbazono]butan-3-one, an oil;

2-[4-(3-4'-methylpiperazin-1'-ylpropyl)thiosemicarbazono]butan-3-one, M.P. 60–63° C., dihydrochloride M.P. 175–177° C.;

2-[4-(2-methyl-3-piperidinopropyl)thiosemicarbazono]butan-3-one, an oil;

2-[4-(3-piperidinobutyl)thiosemicarbazono]butan-3-one, an oil;

2-[4-(4-pyrrolidin-1'-ylbutyl)thiosemicarbazono]butan-3-one, an oil; and

2-[4-(3-2'-oxopyrrolidin-1'-yl-propyl)thiosemicarbazono]butan-3-one, M.P. 136–138° C.

The 4-(2-diethylaminoethyl)thiosemicarbazide used in the preparation of 2-[4-(2-diethylaminoethyl)thiosemicarbazono]butan-3-one hydrochloride hereinbefore described was prepared as follows:

2-diethylaminoethyl isothiocyanate (63 g.) was added slowly during 30 minutes to a stirred solution of hydrazine hydrate (21.9 g.) in ethanol (210 ml.), the temperature of the reaction mixture being maintained at 10°–15° C. by means of an ice-bath. The mixture was then allowed to reach ambient temperature and stirring was continued for a further 45 minutes. The solvent was removed in vacuo and the residual syrup was dried azeotropically with benzene, crystallized from a 1:3 mixture of benzene and petroleum ether (B.P. 60°–80° C.) and dried over silica gel to give pure 4-(2-diethylaminoethyl)thiosemicarbazide (74.4 g.), M.P. 80°–82° C.

In a similar manner, but substituting the appropriate isocyanates of Formula VII for the 2-diethylaminoethyl isothiocyanate, there were prepared the following thiosemicarbazides of Formula III used as starting materials in the preparations of the thiosemicarbazones of Formula V hereinbefore described:

4-(2-dimethylaminoethyl)thiosemicarbazide, M.P. 105–107° C.;
4-(2-piperidinoethyl)thiosemicarbazide, M.P. 119–122° C.;
4-(3-diethylaminopropyl)thiosemicarbazide, an oil;
4-(3-pyrrolidin-1'-ylpropyl)thiosemicarbazide, M.P. 63–64° C.;
4-(3-piperidinopropyl)thiosemicarbazide, M.P. 103–104° C.;
4-(3-4'-methylpiperazin-1'-ylpropyl)thiosemicarbazide, M.P. 126–127° C.;
4-(4-pyrrolidin-1'-ylbutyl)thiosemicarbazide, M.P. 97–100° C.;
4-(3-di-isopropylaminopropyl)thiosemicarbazide, an oil;
4-(3-N-butyl-N-methylaminopropyl)thiosemicarbazide, M.P. 82–84° C.;
4-(3-N-methyl-N-cyclopentylaminopropyl)thiosemicarbazide, M.P. 96–98° C.
4-(3-N-methyl-N-chlohexylaminopropyl)thiosemicarbazide, M.P. 123–124° C.;
4-(3-N-methylanilinopropyl)thiosemicarbazide, M.P. 79–80° C.;
4-(3-N-methyl-N-benzylaminopropyl)thiosemicarbazide, M.P. 60–62° C.;
4-(3-2'-methylpiperidinopropyl)thiosemicarbazide, M.P. 109–110° C.;
4-(3-4'-methylpiperidinopropyl)thiosemicarbazide, M.P. 106–107° C.;
4-(3-4'-ethylpiperidinopropyl)thiosemicarbazide, M.P. 100–101° C.;
4-(3-hexamethyleneiminopropyl)thiosemicarbazide, M.P. 64–65° C.;
4-(3-heptamethyleneiminopropyl)thiosemicarbazide, M.P. 78–79° C.;
4-(2-methyl-3-piperidinopropyl)thiosemicarbazide, M.P. 112–113° C.;
4-(3-piperidinobutyl)thiosemicarbazide, M.P. 102–103° C.;
4-(3-dipropylaminopropyl)thiosemicarbazide, M.P. 79–81° C.; and
4-(3-2'-oxopyrrolidin-1'-ylpropyl)thiosemicarbazide, M.P. 139–141° C.

The 2-diethylaminoethyl isothiocyanate, used in the preparation of 4-(2-diethylaminoethyl)thiosemicarbazide hereinbefore described, was prepared as follows:

Cardon disulphide (67.2 ml.) was added, dropwise over 15 minutes, to a stirred solution containing 2-diethylaminoethylamine (158 ml.) and triethylamine (160 ml.) in methanol (220 ml.), the temperature of the reaction mixture being maintained between −10° and −15° C. by external cooling. The mixture was allowed to warm up to 10° C., cooled to −15° C., and ethyl chloroformate (120 ml.) was added dropwise during 30 minutes, the temperature being maintained between −10° and −15° C. The mixture was allowed to warm up to room temperature and then added during 10 minutes to a vigorously stirred solution of sodium hydroxide (80 g.) in water (800 ml.), ice being added to keep the temperature between 20° and 30° C. The product was extracted into diethyl ether (4× 500 ml.) and the combined ethereal extracts were washed with saturated aqueous sodium chloride (200 ml.) and dried. The solvent was removed in vacuo and the residual oil was distilled to give pure 2-diethylaminoethyl isothiocyanate as a pale yellow oil (124 g.), B.P. 90–95° C. /4 mm. Hg.

In a similar manner, but substituting the appropriate amines of Formula VIII for the 2-diethylaminoethylamine, there were prepared the following isothiocyanates of Formula VII used as starting materials in the preparation of the thiosemicarbazides of Formula III hereinbefore, described:

2-dimethylaminoethyl isothiocyanate, B.P. 130–135° C./0.05 mm. Hg;
3-pyrrolidin-1'-ylpropyl isothiocyanate, B.P. 97–105° C./0.6 mm. Hg;
3-piperidinopropyl isothiocyanate, B.P. 104–110° C./0.2 mm. Hg;
2-piperidinoethyl isothiocyanate, B.P. 105–107° C./0.8 mm. Hg;
3-diethylaminopropyl isothiocyanate, B.P. 88–92° C./1 mm. Hg;
3-dipropylaminopropyl isothiocyanate, an oil; 3-di-isopropylaminopropyl isothiocyanate, B.P. 110–120° C./1.5 mm. Hg;
3-N-butyl-N-methylaminopropyl isothiocyanate, B.P. 103–106° C./0.2 mm. Hg;
3-N-methyl-N-cyclopentylaminopropyl isothiocyanate, B.P. 95–98° C./0.1 mm. Hg;
3-N-methyl-N-cyclohexylaminopropyl isothiocyanate, B.P. 134–136° C./2.0 mm. Hg;
3-N-methylanilinopropyl isothiocyanate, an oil;
3-N-methyl-N-benzylaminopropyl isothiocyanate, B.P. 160–170° C./0.2 mm. Hg;
3-2'-methylpiperidinopropyl isothiocyanate, B.P. 120–130° C./0.2 mm. Hg;
3-4'-methylpiperidinopropyl isothiocyanate, B.P. 115–120° C./0.2 mm. Hg;
3-4'-ethylpiperidinopropyl isothiocyanate, B.P. 125–130° C./0.5 mm. Hg;
3-hexamethyleneiminopropyl isothiocyanate, B.P. 107–112° C./0.025 mm. Hg;
3-heptamethylene-iminopropyl isothiocyanate, B.P. 145–155° C./1.0 mm. Hg;
3-2'-oxopyrrolidin-1'-ylpropyl isothiocyanate, an oil;
3-4'-methylpiperazin-1'-ylpropyl isothiocyanate, B.P. 145–150° C./0.6 mm. Hg;
2-methyl-3-piperidinopropyl isothiocyanate, an oil;
3-piperidinobutyl isothiocyanate, and oil; and
4-pyrrolidin-1'-ylbutyl isothiocyanate, and oil.

The 3-4'-ethylpiperidinopropylamino, B.P. 106–110° C./15 mm. Hg, used in the hereinbefore described preparation of 3-4'-ethylpiperidinopropyl isothiocyanate, was prepared by catalytic hydrogenation of 2-4'-ethylpiperidinopropionitrile, using as catalyst, for example, Raney nickel, preferably in the presence of ammonia. The 2-4'-ethylpiperidinopropionitrile, B.P. 142–145° C./15 mm. Hg, was prepared by the reaction between 4-ethylpiperidine and acrylonitrile.

The 3-methyl-3-piperidinopropylamine, B.P. 102–105° C./15 mm. Hg, used in the hereinbefore described preparation of 3-methyl-3-piperidinopropyl isothiocyanate, was prepared by catalytic hydrogenation of 3-methyl-3-piperidinopropionitrile, using as catalyst, for example, Raney nickel, preferably in the presence of ammonia. The 3-methyl-3-piperidinopropionitrile, B.P. 170° C./15 mm. Hg, was prepared by the reaction between piperidine and crotononitrile.

The remaining amines of Formula VIII, used in the hereinbefore described preparation of the isothiocyanates of Formula VII, were prepared according to the methods described in the following publications:

2-dimethylaminoethylamine, 2-diethylaminoethylamine, 2-piperidinoethylamine and 4-pyrrolidin-1'-ylbutylamine, Lespagnol et al., Congr. Sci. Pharm., 1959, 194; 3-diethylaminopropylamine and 3-piperidinopropylamine, Gurbakhsh Singh and Mahan Singh, J. Ind. Chem. Soc., 1946, 23, 224; 3-dipropylaminopropylamine and 3-di-isopropylaminopropylamine, Burckhalter et al., J.A.C.S., 1943, 65, 2012; 3-N-butyl-N-methylaminopropylamine, 3-N-methyl-N-cyclopentylaminopropylamine, 3-N-methyl-N-cyclohexylaminopropylamine and 3-pyrrolidin-1'-ylpropylamine, Corne et al., J.A.C.S., 1946, 68, 1905; 3-N-methylanilinopropylamine, U.S. Pat. No. 2,991,290; 3-N-methyl-N-benzylaminopropylamine, U.S. Pat. No. 3,054,794; 3-2'-methylpiperidinopropylamine and 3-4'-methylpiperidinopropylamine, Dutch patent application No. 6507170;

3 - hexamethyleneiminopropylamine, German Pat. No. 1,195,762; 3-heptamethyleneiminopropylamine, U.S. Pat. No. 2,928,829; 3-4' - methylpiperazin-1'-ylpropylamine, Rice and Grogan, J. Org. Chem., 1955, 20, 1687; 3-piperidino-2-methylpropylamine, Profft and Oberender, J. Prakt, Chem., 1964, 25, 225; and 3-(2-oxopyrrolidin-1-yl) propylamine, Oediger et al., Berichte, 1966, 99, 2012.

The propyl hydrazinecarbodithioate used in the hereinbefore described synthesis of propyl 2-{1,2-dimethyl-2-[4 - (2-diethylaminoethyl)thiosemicarbazono]ethylidene} hydrazinecarbodithioate was prepared as follows:

To a stirred suspension of hydrazinium dithiocarbazate (14 g.) in dimethylformamide (150 ml.) and water (30 ml.) was added propyl iodide (10 ml.) dropwise during 2 hours, the temperature of the reaction mixture being maintained between 0° and 10° C. by means of external cooling. The mixture was stirred at 0° C. for 24 hours, diluted with water (200 ml.) and extracted with benzene (4× 250 ml.). The combined benzene extracts were diluted with petrol (B.P. 60–80° C.) (1 liter), washed with water (4× 150 ml.), dried and evaporated to dryness in vacuo. The residual oil crystallized from a diethyl ether-petroleum ether (B.P. 40–60° C.) mixture (1:1 by volume) giving propyl hydrazinecarbodithioate (9.0 g.), M.P. 45–47° C.

By proceeding in a similar manner but substituting isopropylbromide, butyl bromide, isobutyl bromide and sec-butyl bromide and ethoxyethyl bromide respectively for the propyl iodide in the hereinbefore described preparation of propyl hydrazinecarbodithioate, there were prepared isopropyl hydrazinecarbodithioate, M.P. 74–75° C., butyl hydrazinecarbodithioate, an oil crystallizing below room temperature, isobutyl hydrazinecarbodithioate, M.P. 57–58° C., and sec-butyl hydrazinecarbodithioate, an oil, and ethoxyethyl hydrazinecarbodithioate, an oil, used as starting materials in the hereinbefore described preparations of compounds of Formula I.

The methyl hydrazinecarbodithioate used as a starting material in the hereinbefore described preparation of compounds of Formula I was prepared according to the method described by Audrieth, Scott and Kippur, J. Org. Chem., 1954, 19, 733; and the ethyl hydrazinecarbodithioate was prepared according to the method described by Sandstrom, Arkiv, Kemi., 1952, 4, 297.

EXAMPLE 2

A solution of 4-(2-diethylaminoethyl)thiosemicarbazide (2.0 g.; prepared as described in Example 1) in warm methanol (10 ml.) was added to a solution of methyl 2 - (1,2 - dimethyl - 2 - oxoethylidene)hydrazinecarbodithioate (2.0 g.) in hot methanol (30 ml.) and glacial acetic acid (2 ml.). The mixture was heated for 5 minutes on the steam bath and was then cooled to ambient temperature and allowed to stand for 24 hours. Ice and an excess of 2 N sodium hydroxide were added, the solution was clarified by filtration through Hyflo Super-cel, the filtrate was neutralized by the addition of glacial acetic acid and the pH was raised to 9–10 by the addition of aqueous sodium carbonate solution. The precipitate was filtered off, washed with water and dried in vacuo over silica gel. Crystallization from methanol and then from benzene gave methyl 2-{1,2-dimethyl-2-[4-(2-diethylaminoethyl)thiosemicarbazono]ethylidene}hydrazinecarbodithioate (0.79 g.), M.P. 177° C. (with decomposition), identical (by melting point, mixed melting point and elemental analysis) with that prepared in Example 1.

In a similar manner, but substituting the appropriate thiosemicarbazides of Formula III and the appropriate hydrazinecarbodithioates of Formula VI, there were prepared the following compounds.

ethyl 2-{1,2-dimethyl-2-[4-(3-N-acetyl-N-isopropylaminopropyl)thiosemicarbazono]ethylidene}hydrazinecarbodithioate, M.P. 159–162° C.;

methyl 2-{1,2-dimethyl-2-[4-(3-N-cyclohexyl-N-methylaminopropyl)thiosemicarbazono]ethylidene}hydrazinecarbodithioate, M.P. 168–170° C. (with decomposition);

methyl 2-{1,2-dimethyl-2-[4-(3-pyrrolidin-1'-ylpropyl) thiosemicarbazono]ethylidene}hydrazinecarbodithioate, M.P. 152–153° C.;

methyl 2-{1,2-dimethyl-2-[4-(3-2'-methylpiperidinopropyl)thiosemicarbazono]ethylidene}hydrazinecarbodithioate, M.P. 157–158° C. (with decomposition);

methyl 2-{1,2-dimethyl-2-[4-(3,4'-ethylpiperidinopropyl) thiosemicarbazono]ethylidene}hydrazinecarbodithioate, M.P. 168–170° C. (with decomposition);

methyl 2-{1,2-dimethyl-2-[4-(3-4'-isopropylpiperidinopropyl)thiosemicarbazono]ethylidene}hydrazinecarbodithioate, M.P. 163–164° C. (with decomposition);

methyl 2-{1,2-dimethyl-2-[4-(3-hexamethyleneiminopropyl)thiosemicarbazono]ethylidene}hydrazinecarbodithioate, M.P. 158–160° C. (with decomposition);

methyl 2-{1,2-dimethyl-2-[4-(3-morpholinopropyl)thiosemicarbazono]ethylidene}hydrazinecarbodithioate, M.P. 190–192° C. (with decomposition);

ethyl 2-{1,2-dimethyl-2-[4-(2-diethylaminoethyl)thiosemicarbazono]ethylidene}hydrazinecarbodithioate;

methyl 2-{1,2-dimethyl-2-[4-(3-diethylaminopropyl) thiosemicarbazono]ethylidene}hydrazinecarbodithioate;

methyl 2-{1,2-dimethyl-2-[4-(3-N-methyl-N-cyclopentylaminopropyl)thiosemicarbazono]ethylidene}hydrazinecarbodithioate;

ethyl 2-{1,2-dimethyl-2-[4-(3-N-cyclohexyl-N-methylaminopropyl)thiosemicarbazono]ethylidene}hydrazinecarbodithioate;

ethyl 2-{1,2-dimethyl-2-[4-(3-pyrrolidin-1'-ylpropyl)thiosemicarbazono]ethylidene}hydrazinecarbodithioate;

methyl 2-{1,2-dimethyl-2-[4-(3-piperidinopropyl)thiosemicarbazono]ethylidene}hydrazinecarbodithioate;

methyl 2-{1,2-dimethyl-2-[4-(3-4'-methylpiperidinopropyl)thiosemicarbazono]ethylidene}hydrazinecarbodithioate;

ethyl 2-{1,2-dimethyl-2-[4-(3,4'-ethylpiperidinopropyl) thiosemicarbazono]ethylidene}hydrazinecarbodithioate;

ethyl 2-{1,2-dimethyl-2-[4-(3-hexamethyleneiminopropyl) thiosemicarbazono]ethylidene}hydrazinecarbodithioate; and methyl 2-{1,2-dimethyl-2-[4-(3,4'-methylpiperazin-1'-ylpropyl)thiosemicarbazono]ethylidene}hydrazinecarbodithioate.

The last ten compounds in the list immediately hereinbefore given were identical with the corresponding products prepared and described in Example 1, by melting point, mixed melting point and elemental analysis.

The methyl 2-(1,2-dimethyl-2-oxoethylidene)hydrazinecarbodithioate, used as a starting material in the hereinbefore described preparation of compounds of Formula I wherein $R^3$ represents a methyl group, was prepared in the following manner:

A solution of methyl hydrazinecarbodithioate (13.0 g.) in warm methanol (50 ml.) was added to a solution of butan-2,3-dione (22.9 g.) in methanol (50 ml.), and the cooled mixture was allowed to stand for 2 hours at ambient temperature. The yellow solid which had separated was collected by filtration and washed with methanol. The filtrate was diluted with an equal volume of water to yield a second crop, and the combined crops were dried over silica gel in vacuo to give pure methyl 2-(1,2-dimethyl-2-oxoethylidene)hydrazinecarbodithioate (19.65 g.), M.P. 151–153° C.

The ethyl 2-(1,2-dimethyl-2-oxoethylidene)hydrazinecarbodithioate, used as a starting material in the hereinbefore described prepartion of compounds of Formula I wherein R³ represents an ethyl group, was prepared in the following manner:

A solution of ethyl hydrazinecarbodithioate (26.6 g.) in methanol (90 ml.) was added dropwise to a stirred solution of butan-2,3-dione (42.85 ml.) in methanol (60 ml.) maintained at room temperature. After the addition was complete the mixture was stirred for 1 hour at room temperature and then cooled in an ice bath. The pale yellow crystals which separated were collected by filtration. The filtrate was concentrated in vacuo and cooled in an ice-bath to yield a second crop. The combined crops were dried in vacuo over silica gel to give pure ethyl 2 - (1,2-dimethyl-2-oxoethylidene)hydrazine-carbodithioate (28.2 g.), M.P. 100–101° C.

The thiosemicarbazides of Formula III, used in the hereinbefore described preparations of the compounds of Formula I, were prepared as described in Example 1. The physical constants of those intermediates not mentioned in Example I are given hereinafter in Table I.

TABLE I

| R¹R²N—A— | Thiosemicarbazides of Formula III | Isothiocyanates of Formula VII |
|---|---|---|
| 3-4'-isopropylpiperidino-propyl. | M.P. 119–120° C. | B.P. 118–124° C./0.25 mm. Hg. |
| 3-morpholinopropyl | M.P. 131–132° C. | B.P. 155–160° C./0.7 mm. Hg. |
| 3-N-acetyl-N-islpropylamino-propyl. | An oil | An oil. |

3-4'-isopropylpiperidinopropylamine was prepared as described in U.S. Pat. No. 3,211,736, and 3-morpholinopropylamine was prepared as described by Heine et al., J.A.C.S., 1956, 78, 672.

The 3-N-acetyl - N - isopropylaminopropylamine, B.P. 148–150° C./20 mm. Hg, used in the hereinbefore described preparation of 3-N-acetyl-N-isopropylaminopropyl isothiocyanate, was prepared by catalytic hydrogenation of 3-N-acetyl-N-isopropylaminopropionitrile, using as catalyst, for example, Raney nickel, preferably in the presence of ammonia. The 3-N-acetyl-N-isopropylaminopropionitrile, M.P. 58–62°, was prepared by the acetylation of 3-isopropylaminopropionitrile, B.P. 186° C., itself prepared by the reaction between isopropylamine and acrylonitrile.

EXAMPLE 3

Methyl 2-{1,2-dimethyl - 2 - [4 - (2-dimethylaminoethyl)thiosemicarbazono]ethylidene}hydrazinecarbodithioate (3.62 g.) (prepared as described in Example 1) in warm dimethylformamide (10 ml.) was treated with a warm solution of manganese acetate tetrahydrate (2.45 g.) in warm dimethylformamide (25 ml.). The mixture was allowed to stand for 15 minutes at ambient temperature and then the brownish crystals were filtered off and washed with methanol to give the manganese chelate of methyl 2-{1,2-dimethyl-2-[4-(2 - diethylaminoethyl)thiosemicarbazono]ethylidene}hydrazinecarbodithioate acetate (2.35 g.), M.P. 197–199° C. (with decomposition).

Similarly prepared, but substituting cupric acetate monohydrate and zinc acetate dihydrate for manganese acetate tetrahydrate in the above example, were the cupric chelate of methyl 2-{1,2-dimethyl-2-[4-(2-diethylaminoethyl)thiosemicarbazono]ethylidene}hydrazinecarbodithioate acetate, M.P. 160–163° C. (with decomposition) and the zinc chelate of methyl 2-{1,2-dimethyl-2-[4-(2 - diethylaminoethyl)thiosemicarbazono]ethylidene}hydrazinecarbodithioate acetate, M.P. 193–195° C. (with decomposition).

By following the same procedure but substituting ethyl 2-{1,2 - dimethyl - 2 - [4-(2-diethylaminoethyl)thiosemicarbazono]ethylidene}hydrazinecarbodithioate for methyl 2-{1,2 - dimethyl-2-[4-(2-diethylaminoethyl)thiosemicarbazono]ethylidene}hydrazinecarbodithioate in the above example and using manganese acetate tetrahydrate, cupric acetate monohydrate and zinc acetate dihydrate respectively, there were prepared the manganese chelate of ethyl 2-{1,2 - dimethyl2-[4-(2-diethylaminoethyl)thiosemicarbazono]ethylidene}hydrazinecarbodithioate acetate, M.P. 173–174° C. (with decomposition), the cupric chelate of ethyl 2 - {1,2-dimethyl-2-[4-2-diethylaminoethyl)thiosemicarbazono]ethylidene}hydrazinecarbodithioate acetate, M.P. 161–163° C. (with decomposition) and the zinc chelate of ethyl 2-{1,2-dimethyl-2-[4-(2-diethylaminoethyl)thiosemicarbazono]ethylidene}hydrazinecarbodithioate acetate, M.P. 190–192° C. (with decomposition).

According to a further feature of the present invention, there are provided compositions suitable for administration to chickens or turkeys for the prevention or treatment of coccidiosis, including concentrates for addition to chicken or turkey feedstuffs or drinking water, comprising, as active ingredient, one or more of the hydrazinecarbodithioate derivatives of General Formula I, or their metal chelates, or non-toxic acid addition salts thereof, in particular one or more of ethyl 2-{1,2-dimethyl-2-[4-(2-diethylaminoethyl)thiosemicarbazono]ethylidene}hydrazinecarbodithioate, ethyl 2-{1,2-dimethyl-2-[4-(3-diethylaminopropyl)thiosemicarbazono]ethylidene}hydrazinecarbodithioate, ethyl 2-{1,2-dimethyl-2-[4-(3-pyrrolidin-1-ylpropyl)thiosemicarbazono]ethylidene}hydrazinecarbodithioate, ethyl 2-{1,2-dimethyl-2-[4-(3-piperidinopropyl)thiosemicarbazono]ethylidene}hydrazinecarbodithioate, ethyl 2-{1,2-dimethyl-2-[4-(3-4'-methylpiperidinopropyl)thiosemicarbazono]ethylidene}hydrazinecarbodithioate, and ethyl 2-{1,2-dimethyl-2-[4-(3-4'-methylpiperazin-1'-ylpropyl)thiosemicarbazono]ethylidene}hydrazinecarbodithioate, in association with a physiologically innocuous carries (i.e. a carrier which is not harmful to the birds at the dosages used) which may be a solid, semi-solid or a liquid. Such compositions are conveniently produced by intimately dispersing the active ingredient throughout the carrier, if necessary, where the carrier is a liquid in which the active ingredient is but sparingly soluble (e.g. water), using an emulsifying, dispersing, suspending or wetting agent.

Preferred compositions are solids or semi-solids in which the carrier is provided at least in part, and preferably entirely, by a chicken or turkey feedstuff, i.e. an organic or mineral substance which is intended to be fed to the bird; that is to say, the active ingredient may be incorporated in a solid or semi-solid feedstuff. Incorporation of the active ingredient in the feedstuff, which may be a commercial starter, grower, layer or breeder feed, may be effected by any conventional method such as stirring, tumbling or grinding. Compositions of varying concentrations can be prepared by altering the ratio of carrier to active ingredient. The active ingredient may also be incorporated in the feedstuff in the form of a powder concentrate containing active ingredient and a solid, physiologically innocuous carrier, e.g. wheat middlings, talc, kaolin or chalk or a diatomaceous earth, such as kieselguhr, or a mixture thereof, and such compositions are also included within the scope of this invention. These compositions may also contain agents to promote adhesion of the active ingredient to the carrier, for example soya oil. To the active ingredient or powders containing it, there may be added, before admixture with the feedstuff, one or more physiologically innocuous wetting and/or dispersing agents, for example, the condensation product of β-naphthalene-sulphonic acid and formaldehyde, sodium lauryl sulphate or polyoxyethylene (20) sorbitan monooleate. Alternatively, when a wetting, suspending, emulsifying or dispersing agent is added to the active ingredient or powder, the compositions so obtained may be mixed with water to provide stable dispersions suitable for addition to feedstuffs.

Compositions suitable for addition to feedstuffs which comprise the active ingredient in association with a wetting, suspending, dispersing or emulsifying agent, with or without a physiologically innocuous carrier, are also included within the scope of this invention.

Liquid compositions may be dispersions of the active ingredient in drinking water, and these compositions may be prepared from concentrates which may be added to water, or are self-emulsifying with water. Such concentrates comprise the active ingredient in association with one or more wetting, suspending, dispersing, emulsifying, thickening or gelling agents, with or without a physiologically innocuous carrier, or in association with a water-soluble physiologically innocuous carrier, and are included within the scope of this invention. Examples of these concentrates are:

(1) Mixtures of the active ingredient with a wetting, dispersing, thickening or gelling agent or a combination of such agents with or without a water-soluble physiologically innocuous carrier, e.g. water;

(2) Powders comprising the active ingredient, a physiologically innocuous carrier, and a wetting, suspending or dispersing agent;

(3) Stable dispersions obtained by mixing concentrates of types (1) or (2) with water; and (4) Mixtures of the active ingredient with a water-soluble physiologically innocuous carrier, e.g. sucrose or glucose.

Suitable dispersing agents include ethylene oxide/glyceride oil condensates, ethylene oxide/fatty alkylamine condensates and polyoxyethylene (20) sorbitan monooleate. Suitable thickening agents include sodium carboxymethylcellulose and water-soluble gums, e.g. gum tragacanth. Finely divided attapulgite clays may be used as gelling agents.

It is also possible to administer the coccidiostats of the present invention orally to chickens in the form of granules, pellets, suspensions, solutions and emulsions comprising the active ingredient in association with suitable physiologically innocuous carriers and adjuvants. Such administration is, however, generally less convenient and therefore such compositions are not preferred.

Concentrates for addition to chicken or turkey feed generally contain from about 1% to about 90% by weight of the active ingredient and preferably about 4–50% by weight adsorbed on or mixed with a carrier. Feedstuffs and drinking water generally contain from about 0.0025% to about 0.025%, more particularly from 0.005% to 0.015%, in feedstuffs, by weight of the active ingredient.

It will be appreciated that when concentrates in the form of pellets or granules are employed as the means for administration of the coccidiostats, the proportion of active ingredient present in the pellets or granules themselves is considerably higher than the above-mentioned proportions suitable in feedstuffs for the effective prophylactic control of coccidiosis, and that the concentrates can be distributed throughout a chicken or turkey feedstuff so as to give, on average over the whole of the feed, an anti-coccidially-effective amount of the active ingredient.

The compositions of the invention suitable for the prevention or treatment of coccidiosis in chickens may, if desired, also contain one or more additional prophylactic or therapeutic agents, for example anti-bacterial agents such as furazolidone or other anticoccidial agents known to be suitable for use in the prevention or treatment of coccidiosis in chickens such as 1-(4-amino-2-propyl-5-pyrimidinylmethyl)2 - picolinium chloride hydrochloride (amprolium), 3,5-dinitro-o-toluamide (zoalene), 2-sulphanilamidoquinoxaline (sulphaquinoxaline), 5-nitro-2-furaldehyde semicarbazone (nitrofurazone), 3,5-dichloro-2,6-dimethyl-4-pyridinol (meticlorpindol) and quinoline-3-carboxylate coccidiostats, e.g. ethyl 6,7-diisobutoxy-4-hydroxyquinoline-3-carboxylate (buquinolate), ethyl 6-n-decyloxy-7-ethoxy-4 - hydroxyquinoline - 3 - carboxylate (decoquinate) and methyl 7-benzyloxy-6-n-butyl-4-hydroxy-quinoline-3-carboxylate (methyl benzoquate). The compositions of the invention suitable for the prevention or treatment of coccidiosis in turkeys may, if desired, also contain one or more additional prophylactic or therapeutic agents, for example anti-bacterial agents such as furazolidone or other anti-coccidial agents known to be suitable for use in the prevention or treatment of coccodiosis in turkeys, such as amprolium, sulphaquinoxaline and mixtures of amprolium, sulphaquinoxaline and methyl 4-acetamido-2-ethylbenzoate (ethopabate), e.g. the mixture "Pancoxin."

The compositions of the present invention may also contain other substances known to be useful in promoting the growth of poultry or their egg production, e.g. 4-hydroxy-3-nitrophenylarsonic acid and antibiotics such as pencillin and penicillin derivatives.

The following example illustrates the compositions of the present invention.

EXAMPLE 4

Ethyl 2-{1,2-dimethyl-2-[4-(2 - diethylaminoethyl)thiosemicarbazono]ethylidene}hydrazinecarbodithioate (18 parts by weight) was added to wheat middlings (82 parts by weight) and intimately mixed. The mixture was incorporated in a feedstuff suitable for chickens to give a final concentration of 0.0025% to 0.025% of the hydrazinecarbodithioate. The treated feedstuff was suitable for feeding to chickens to prevent coccidiosis, particularly coccidiosis caused by E. acervulina and E. tenella.

We claim:
1. A compound of the formula:

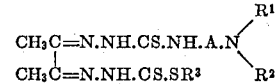

wherein each of $R^1$ and $R^2$ represents alkyl of 1 to 6 carbon atoms, phenyl, phenylalkyl of 1 to 6 carbon atoms in the alkyl residue, cycloalkyl of 5 or 6 carbon atoms, or cycloalkylalkyl in which the cycloalkyl moiety is of 5 or 6 carbon atoms and the alkyl moiety is of 1 to 4 carbon atoms, or $R^1$ represents alkanoyl in which the alkyl portion is of 1 to 6 carbon atoms and $R^2$ is as hereinbefore defined, or $R^1$ and $R^2$ together with the nitrogen atom to which they are attached form a pyrrolidin-1-yl, 2-oxo-pyrrolidin-1-yl, piperidino, morpholino, hexamethyleneimino, heptamethyleneimino, or N-alkyl-piperazin-1-yl radical, or a said radical carrying an alkyl substituent of 1 to 6 carbon atoms on a carbon atom, $R^3$ represents alkyl of 1 to 4 carbon atoms, or alkyl of 1 to 4 carbon atoms substituted by alkoxy of 1 to 4 carbon atoms, and A represents a divalent polymethylene group of 2 to 4 carbon atoms, or a divalent polymethylene group of 2 to 4 carbon atoms substituted by alkyl of 1 to 6 carbon atoms, and non-toxic acid addition salts thereof.

2. A compound according to claim 1 wherein $R^1$ represents alkyl of 1 to 6 carbon atoms, phenyl or phenylalkyl of 1 to 6 carbon atoms in the alkyl residue, cycloalkyl of 5 or 6 carbon atoms, or alkanoyl in which the alkyl portion is of 1 to 6 carbon atoms, and $R^2$ represents alkyl of 1 to 6 carbon atoms, or $R^1$ and $R^2$ together with the nitrogen atom to which they are attached form a pyrrolidin-1-yl, 2-oxopyrrolidin-1-yl, piperidino, morpholino, hexamethyleneimino, heptamethyleneimino or N-alkylpiperazin-1-yl group, or a said heterocyclic radical carrying an alkyl substituent of 1 to 6 carbon atoms on a carbon atom of the heterocyclic nucleus, and non-toxic acid addition salts thereof.

3. A compound of the formula:

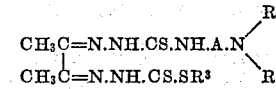

wherein $R^1$ and $R^2$ together with the nitrogen atom to which they are attached form a pyrrolidin-1-yl, 2-oxopyrrolidin-1-yl, piperidino, morpholino, hexamethyleneimino, heptamethyleneimino, or N-alkylpiperazin-1-yl group, or a said heterocyclic radical carrying an alkyl substituent of 1 to 6 carbon atoms on a carbon atom of the heterocyclic nucleus, $R^3$ represents alkyl of 1 through 4 carbon atoms, or alkyl of 1 through 4 carbon atoms substituted by alkoxy of 1 through 4 carbon atoms, and A represents a divalent polymethylene group of 2 through 4 carbon atoms, or a divalent polymethylene group of 2 through 4 carbon atoms substituted by alkyl of 1 to 6 carbon atoms, and non-toxic acid addition salts thereof.

4. A compound of the formula:

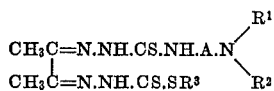

wherein $R^1$ and $R^2$ together with the nitrogen atom to which they are attached form a pyrrolidin-1-yl or 2-oxopyrrolidin-1- group, or a said pyrrolidinyl radical carrying an alkyl substituent of 1 to 6 atoms on a carbon atom of the pyrrolidinyl nucleus, $R^3$ represents alkyl of 1 through 4 carbon atoms, or alkyl of 1 through 4 carbon atoms substituted by alkoxy of 1 through 4 carbon atoms, and A represents a divalent polymethylene group of 2 through 4 carbon atoms, or a divalent polymethylene group of 2 through 4 carbon atoms substituted by alkyl of 1 to 6 carbon atoms, and non-toxic acid addition salts thereof.

5. A compound according to claim 4 wherein $R^3$ represents alkyl of 1 through 3 carbon atoms, or alkyl of 1 through 3 carbon atoms substituted by alkoxy of 1 through 4 carbon atoms.

6. A compound according to claim 4 wherein $R^3$ represents ethyl.

7. A compound according to claim 2 wherein $R^3$ represents alkyl of 1 through 3 carbon atoms, or alkyl of 1 through 3 carbon atoms substituted by alkoxy of 1 through 4 carbon atoms.

8. A compound according to claim 2 wherein $R^3$ represents ethyl.

9. Ethyl 2-{1,2 - dimethyl-2-[4-(2-diethylaminoethyl) thiosemicarbazono ] ethylidene } hydrazinecarbodithioate, and non-toxic acid addition salts thereof.

10. Ethyl 2-{1,2-dimethyl-2-[4-(3-diethylaminopropyl) thiosemicarbazono ] ethylidene } hydrazinecarbodithioate, and non-toxic acid addition salts thereof.

11. Ethyl 2-{1,2-dimethyl-2-[4-(3-pyrrolidin-4'-ylpropyl ) thiosemicarbazono ] ethylidene } hydrazinecarbodithioate, and non-toxic acid addition salts thereof.

12. Ethyl 2-{1,2 - dimethyl-2-[4-(3-piperidinopropyl) thiosemicarbazono ] ethylidene } hydrazinecarbodithioate, and non-toxic acid addition salts thereof.

13. Ethyl 2-{1,2-dimethyl-2-[4-(3,4'-methylpiperidinopropyl)thiosemicarbazono ] ethylidene}hydrazinecarbodithioate, and non-toxic acid addition salts thereof.

14. Ethyl 2-{1,2 - dimethyl-2-[4-(3-4'-methylpiperazin-1' ₋ ylpropyl)thiosemicarbazono]ethylidene}hydrazinecarbodithioate, and non-toxic acid addition salts thereof.

References Cited
UNITED STATES PATENTS 3,478,035  11/1969  Barrett _____ 260—326.83 X JOSEPH A. NARCAVAGE, Primary Examiner U.S. Cl. X.R.

260—239 BF, 247.1, 293.85, 326.5 S, 326.83, 455 A, 429.7, 429.9, 438.1, 439; 424—245, 250, 267, 274, 287, 300, 323